(12) United States Patent
Verthein et al.

(10) Patent No.: US 9,516,271 B2
(45) Date of Patent: Dec. 6, 2016

(54) AUTO-ADJUSTING CONTENT SIZE RENDERED ON A DISPLAY

(71) Applicant: MICROSOFT TECHNOLOGY LICENSING, LLC, Redmond, WA (US)

(72) Inventors: William Verthein, Sammamish, WA (US); Simone Leorin, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/665,923

(22) Filed: Oct. 31, 2012

(65) Prior Publication Data

US 2014/0118403 A1    May 1, 2014

(51) Int. Cl.
*H04N 7/15*    (2006.01)

(52) U.S. Cl.
CPC ..................... *H04N 7/15* (2013.01)

(58) Field of Classification Search
CPC  G06F 3/00; G06F 3/0481; G06F 2203/04806; G09G 2340/0442; G09G 2340/045; G06T 3/40; G06T 3/4007–3/4092; H04N 7/15
USPC .......... 345/660–671; 715/800, 801
See application file for complete search history.

(56) References Cited

U.S. PATENT DOCUMENTS

| | | | |
|---|---|---|---|
| 6,016,494 A * | 1/2000 | Isensee et al. ............... 707/726 |
| 7,325,197 B1 * | 1/2008 | Massena et al. ............. 715/251 |
| 7,714,879 B2 | 5/2010 | Asai et al. |
| 8,139,118 B2 | 3/2012 | Yoshida |
| 8,499,038 B1 * | 7/2013 | Vucurevich .................... 709/204 |
| 9,047,054 B1 * | 6/2015 | Goldstein ............... G06F 3/165 |
| 2001/0055020 A1 * | 12/2001 | Hertzfeld ..................... 345/472 |
| 2003/0006973 A1 * | 1/2003 | Omura et al. .............. 345/175 |
| 2003/0128184 A1 * | 7/2003 | Broussard ............ G06F 17/243 345/156 |
| 2003/0234799 A1 * | 12/2003 | Lee .............................. 345/660 |

(Continued)

FOREIGN PATENT DOCUMENTS

| | | | |
|---|---|---|---|
| GB | 2467898 A | * | 8/2010 |
| WO | WO 2005052673 A2 | * | 6/2005 |
| WO | WO 2011072497 A1 | * | 6/2011 |

OTHER PUBLICATIONS

Coyier C, Prevent iPhone Text Enlargement, 2008, retrieved from <<https://css-tricks.com/prevent-iphone-text-enlargement/>>, accessed Mar. 10, 2015.*

(Continued)

*Primary Examiner* — Michael J Cobb
(74) *Attorney, Agent, or Firm* — Monica Adjemian; Sudhanshu Sohoni; Micky Minhas

(57) ABSTRACT

Various technologies described herein pertain to managing visual content rendering on a display. Audience presence and position information, which specifies respective distances from the display of a set of audience members detected within proximity of the display, can be obtained. Further, a threshold distance from the display can be determined as a function of the respective distances from the display of the set of audience members detected within proximity of the display. Moreover, responsive to the threshold distance from the display, a size of the visual content rendered on the display can be controlled.

19 Claims, 11 Drawing Sheets

(56) References Cited

U.S. PATENT DOCUMENTS

| | | | |
|---|---|---|---|
| 2004/0148210 A1* | 7/2004 | Barrett et al. | 705/7 |
| 2004/0246272 A1* | 12/2004 | Ramian | 345/660 |
| 2005/0038868 A1* | 2/2005 | Spicer | 709/217 |
| 2005/0229200 A1* | 10/2005 | Kirkland et al. | 725/12 |
| 2007/0011196 A1 | 1/2007 | Ball et al. | |
| 2007/0044028 A1* | 2/2007 | Dunn et al. | 715/761 |
| 2007/0106950 A1* | 5/2007 | Hutchinson et al. | 715/761 |
| 2008/0144942 A1* | 6/2008 | Besley et al. | 382/209 |
| 2008/0201648 A1* | 8/2008 | Earp et al. | 715/762 |
| 2008/0248781 A1* | 10/2008 | Cedo Perpinya | G06Q 30/02 455/412.1 |
| 2009/0005071 A1* | 1/2009 | Forstall | G06F 3/0481 455/456.1 |
| 2009/0085922 A1 | 4/2009 | Harris et al. | |
| 2009/0141147 A1 | 6/2009 | Alberts et al. | |
| 2010/0123686 A1* | 5/2010 | Klinghult et al. | 345/178 |
| 2010/0328317 A1 | 12/2010 | Lindfors | |
| 2011/0131153 A1 | 6/2011 | Grim, III et al. | |
| 2011/0254846 A1 | 10/2011 | Lee et al. | |
| 2012/0084717 A1* | 4/2012 | Yao et al. | 715/792 |
| 2012/0165068 A1* | 6/2012 | Glebe | 455/556.1 |
| 2012/0206453 A1* | 8/2012 | Bruls et al. | 345/419 |
| 2012/0299817 A1* | 11/2012 | Atkins et al. | 345/156 |
| 2012/0327099 A1* | 12/2012 | Vojak | 345/581 |
| 2013/0007603 A1* | 1/2013 | Dougherty et al. | 715/251 |
| 2013/0038634 A1* | 2/2013 | Yamada et al. | 345/649 |
| 2013/0057553 A1* | 3/2013 | Chakravarthula | G06F 3/011 345/468 |
| 2013/0165151 A1* | 6/2013 | Gits | H04W 4/023 455/456.3 |
| 2013/0317895 A1* | 11/2013 | Turner | H04W 4/023 705/14.16 |
| 2014/0035814 A1* | 2/2014 | de Lima | G06F 1/3265 345/158 |

OTHER PUBLICATIONS

Apple, Safari Web Content Guide: Customizing Style Sheets, 2010, retrieved from <<http://developer.apple.com/library/safari/documentation/AppleApplications/Reference/SafariWebContent/AdjustingtheTextSize/AdjustingtheTextSize.html>>, accessed Mar. 10, 2015.*

55Minutes, iPhone Text Resizing, 2012, <<http://blog.55minutes.com/2012/04/iphone-text-resizing/>>, accessed Mar. 10, 2015.*

"Big Displays for Big Business", Retrieved at <<http://panasonic.net/prodisplays/download/pdf/catalogs/big_plasma_0225_.pdf>>, Retrieved Date: Sep. 24, 2012, pp. 1-10.

Bravo, et al., "Display-based services through identification: An approach in a conference context", Retrieved at <<http://mami.uclm.es/mami/files/ucami_jbravo_final.pdf>>, In the proceedings of Ubiquitous Computing & Ambient Intelligence (UCAmI'05), 2005, pp. 1-8.

Schmidt, Albrecht, "Interactive Context-Aware Systems Interacting with Ambient Intelligence", Retrieved at <<http://www.neurovr.org/emerging/book5/09_AMI_Schmidt.pdf>>, In the Proceedings of Ambient Intelligence 2005, Apr. 2, 2005, pp. 159-178.

"Polycom® EagleEye Director", Retrieved at <<http://www.polycom.com/global/documents/products/telepresence_video/datasheets/eagleeye-director-datasheet.pdf>>, Retrieved Date: Sep. 24, 2012, pp. 1-2.

"International Search Report & Written Opinion for PCT Patent Application No. PCT/US2013/067363", Mailed Date: Mar. 6, 2014, Filed Date: Oct. 30, 2013, 8 Pages.

"Response to the Rule 161 Communication for European Patent Application No. 13789931.6", Filed Date: Sep. 9, 2015, 10 Pages.

* cited by examiner

AUTO-ADJUSTING CONTENT SIZE RENDERED ON A DISPLAY

BACKGROUND

Visual content is commonly presented to members of an audience. Conventional approaches for displaying visual content for consumption by the audience members commonly involve showing such visual content on a medium such as a blackboard, whiteboard, poster, or the like. Moreover, displays are oftentimes utilized to present information in a visual form to a number of audience members.

By way of example, displays are oftentimes employed in settings such as classrooms, conference rooms, and so forth to allow a presenter to show visual content to the audience members. Substantially any type of visual content can be rendered upon a display to the audience members. For instance, videos, static images, text, and the like can be outputted upon the display to the audience members.

SUMMARY

Described herein are various technologies that pertain to managing visual content rendering on a display. Audience presence and position information, which specifies respective distances from the display of a set of audience members detected within proximity of the display, can be obtained. For instance, the audience presence and position information can be received from a sensor (e.g., camera(s), mobile device(s), etc.). Additionally or alternatively, the audience presence and position information can be detected from data collected via the sensor. Further, a threshold distance from the display can be determined as a function of the respective distances from the display of the set of audience members detected within proximity of the display. Moreover, responsive to the threshold distance from the display, a size of the visual content rendered on the display can be controlled.

In various embodiments, the size of the visual content rendered on the display can be adjusted over time as a function of determined changes in the threshold distance from the display over time. For instance, as audience member(s) enter into proximity of the display, exit from proximity of the display, move within proximity of the display, or a combination thereof, changes in the threshold distance from the display can be determined. Moreover, based upon such changes to the threshold distance, the visual content can be resized. Accordingly, the visual content can be automatically resized based upon presence and position of the audience members, thereby enabling the audience members in attendance to view such visual content rendered on the display. Examples of the visual content that can be dynamically sized based upon the threshold distance include text, graphical objects, lines generated during an interactive whiteboard session, and so forth.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
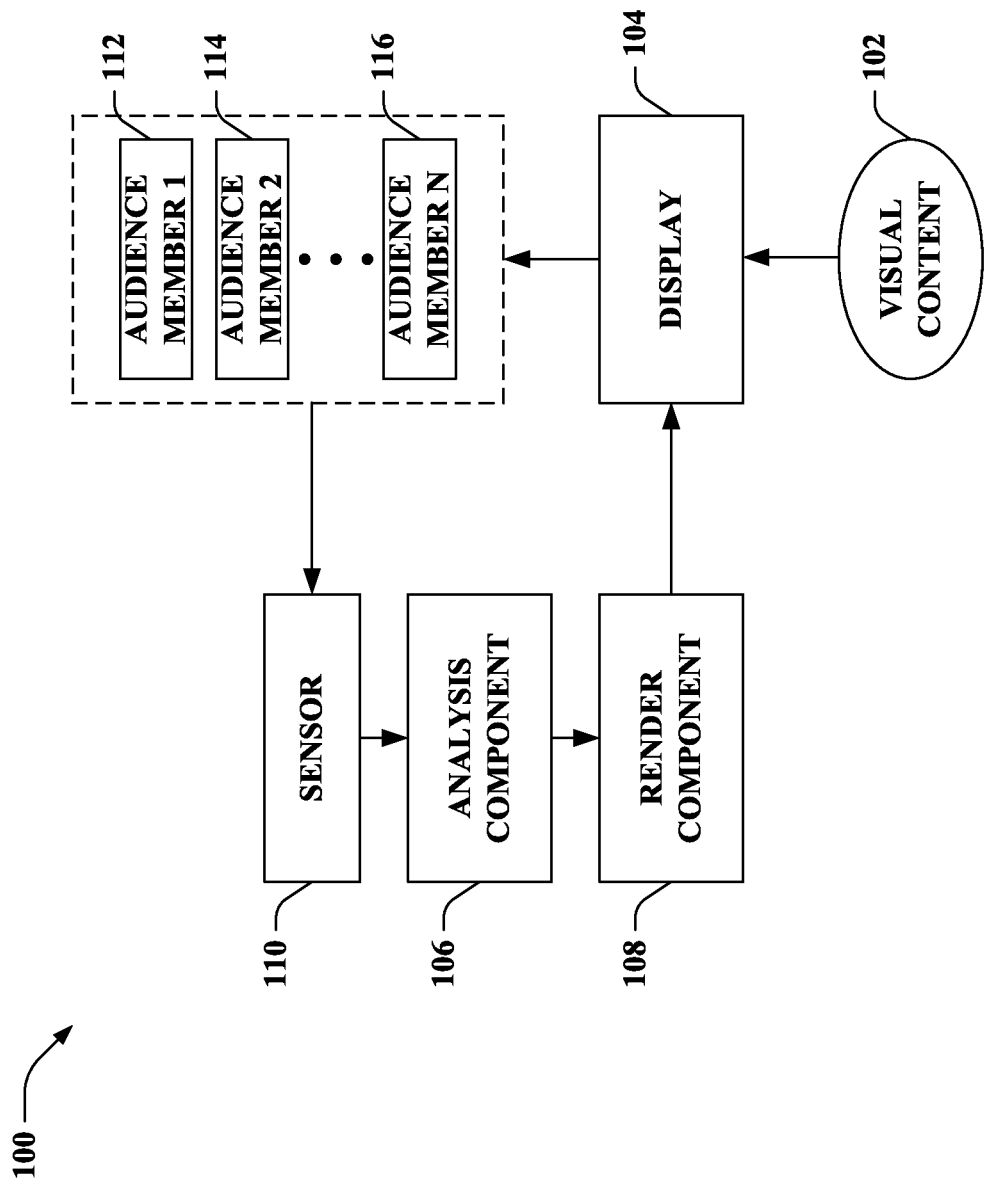
FIG. 1 illustrates a functional block diagram of an exemplary system that facilitates managing visual content rendered on a display.

Various technologies pertaining to auto-adjusting size of visual content rendered on a display are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, size of visual content rendered on a display can be controlled to enable audience members attending or joining a meeting, class, etc. (e.g., within proximity of the display) to consume such visual content.

For instance, the size of text, graphical objects, etc. on the display can be automatically adjusted based on audience members within proximity of the display and respective positions of such audience members to provide a view that on average can serve the audience members in attendance regardless of their positions with respect to the display. The proximity of the display can be checked to identify the audience members in attendance and locations of such audience members at any given time. Moreover, possible position changes of audience member(s), which can lead to resizing the visual content, can be detected. If additional audience member(s) are detected within proximity of the display, audience member(s) are detected to have exited proximity of the display, and/or audience member(s) are detected to have changed positions within proximity of the display, then an evaluation can be performed to determine whether to resize the visual content based on heuristics and calculated distances of the audience members from the display where the visual content is rendered; based thereupon, resizing, zooming, etc. can be triggered. Further, to mitigate continuous resizing in the case of frequent changes and/or movements within proximity of the display, the size adjustments can be preset to specific discrete values; yet, the claimed subject matter is not so limited.

Referring now to the drawings, FIG. 1 illustrates a system 100 that facilitates managing visual content 102 rendered on a display 104. The system 100 includes an analysis component 106 that can receive audience presence and position information that specifies respective distances from the display 104 of a set of audience members 112-116 detected within proximity of the display 104. Moreover, the analysis component 106 can determine a threshold distance from the display 104 as a function of the respective distances from the display 104 of the set of audience members 112-116 detected within proximity of the display 104. The system 100 further includes a render component 108 that can control a size of the visual content 102 rendered on the display 104 as a function of the threshold distance from the display 104.

The set of audience members 112-116 detected within proximity of the display 104 can include substantially any number of audience members. As illustrated, the set of audience members 112-116 can include an audience member 1 112, an audience member 2 114, . . . , and an audience member N 116 (collectively referred to herein as audience members 112-116 or the set of audience members 112-116), wherein N can be substantially any integer greater than or equal to three. Moreover, it is contemplated that fewer than three audience members 112-116 can be detected to be within proximity of the display 104.

The proximity of the display 104 can be a room in which the display 104 is located, an area within a predefined distance from the display 104, and so forth. According to an example, the display 104 can be located in a room such as a conference room, a classroom, or the like; thus, audience members within such room can be identified as being the audience members 112-116 detected within proximity of the display 104. Moreover, the audience members 112-116 within proximity of the display 104 can be located at various positions with respect to the display 104. At a given time, each of the audience members 112-116 is located at a corresponding respective distance from the display 104 (e.g., the audience member 1 112 is at a first distance, the audience member 2 114 is at a second distance, . . . , and the audience member N is at an Nth distance).

The number of audience members 112-116 within proximity of the display 104 can vary over time. For example, an audience member can move from outside proximity of the display 104 to a position within proximity of the display 104 over time, thereby increasing the number of audience members 112-116 within proximity of the display 104. According to another example, an audience member within proximity of the display 104 (e.g., one or more of the audience members 112-116) can move out of proximity of the display 104 over time, which can decrease the number of audience members 112-116 within proximity of the display 104. Moreover, the position of one or more of the audience members 112-116 with respect to the display 104 can change over time. For example, an audience member within proximity of the display 104 (e.g., one or more of the audience members 112-116) can relocate with respect to the display 104 (e.g., move towards the display 104 or move away from the display 104) over time while remaining within proximity of the display 104.

A sensor 110 can track the audience members 112-116 within proximity of the display 104. In accordance with various embodiments, the sensor 110 can be a camera (or a plurality of cameras). According to other embodiments, the sensor 110 can be one or more mobile devices. Yet, it is to be appreciated that the sensor 110 can be substantially any type of device that can generate information from which audience presence and position information can be determined.

Figure 2:
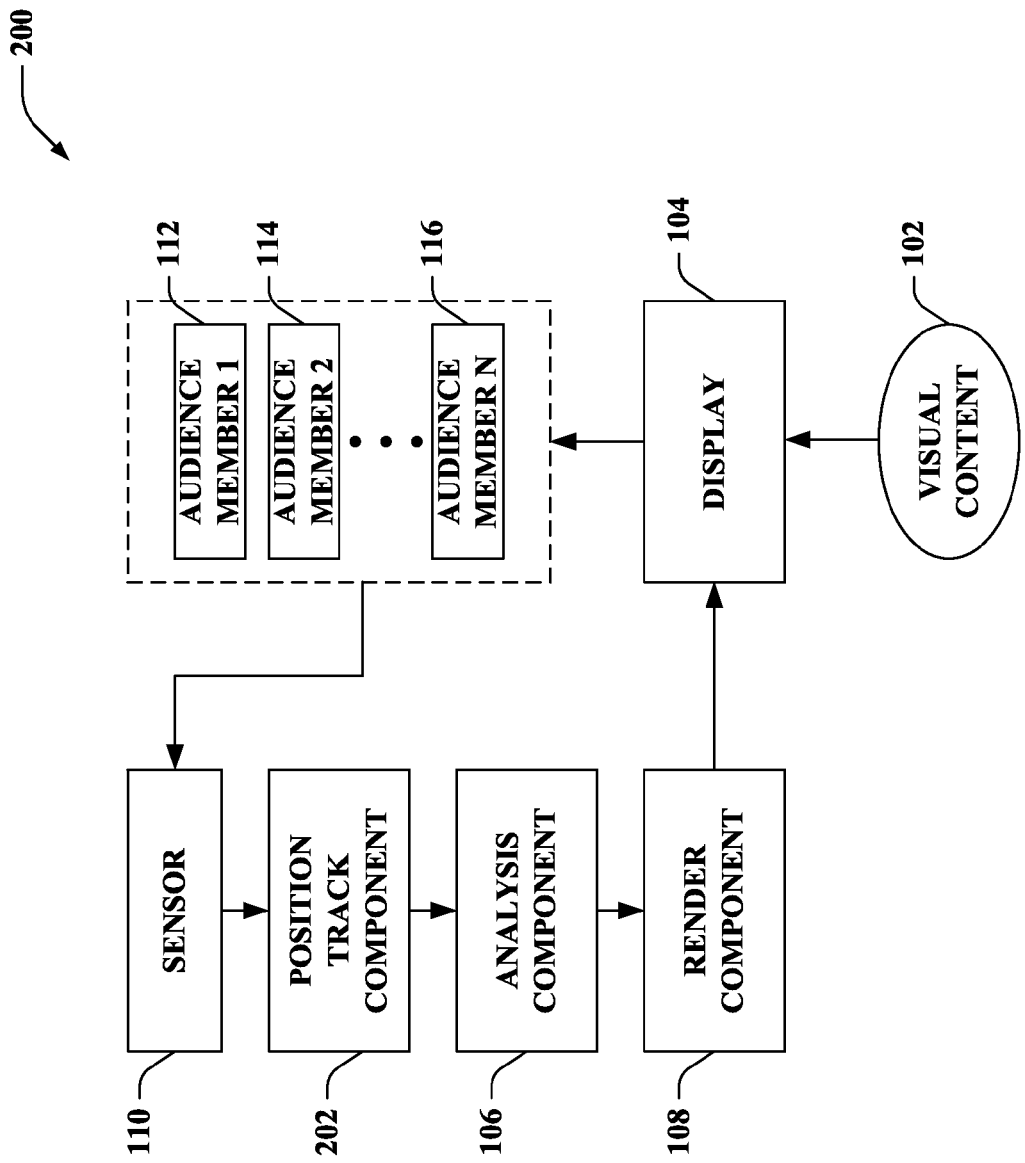
FIG. 2 illustrates a functional block diagram of an exemplary system that tracks audience members within proximity of the display for managing visual content rendered on the display.

According to an example, the sensor 110 can generate audience presence and position information. Following this example, the sensor 110 can detect the audience members 112-116 that are within proximity of the display 104 and determine the respective distances from the display 104 of such audience members 112-116. The sensor 110 can further provide the audience presence and position information to the analysis component 106. However, in accordance with another example (e.g., as shown in FIG. 2), it is contemplated that the sensor 110 can provide data to a position track component, which can generate the audience presence and position information from the data obtained from the sensor 110 and provide the audience presence and position information to the analysis component 106.

The analysis component 106 can receive the audience presence and position information over time, where the audience presence and position information can specify respective distances from the display 104 of the set of audience members 112-116 detected within proximity of the display 104. Moreover, the analysis component 106 can determine the threshold distance from the display 104 as a function of the respective distances from the display 104 of the set of audience members 112-116 detected within proximity of the display 104.

By way of example, the threshold distance from the display 104 determined by the analysis component 106 can be a maximum distance from the display 104 out of the respective distances from the display 104 of the set of audience members 112-116 detected within proximity of the display 104. In accordance with an exemplary illustration, the audience presence and position information obtained by the analysis component 106 can indicate that five audience members 112-116 are within proximity of the display 104 and are respectively positioned at the following distances from the display 104: five feet, five feet, eight feet, ten feet, and fifteen feet. Following this illustration, the threshold distance determined by the analysis component 106 can be the maximum distance from the foregoing respective distances, and thus, the threshold distance can be fifteen feet.

According to another example, the threshold distance from the display 104 determined by the analysis component 106 can be a distance at which the respective distances from the display 104 of a preset percentage of the audience members 112-116 in the set are less than or equal to such distance. For instance, the preset percentage can be 80%. Thus, the threshold distance can be a distance at which the respective distances of 80% of the audience members 112-116 are less than or equal to such distance. However, it is to be appreciated that substantially any other preset percentage is intended to fall within the scope of the hereto appended claims. Reference is again made to the above exemplary illustration where the audience presence and position information obtained by the analysis component 106 indicates that five audience members 112-116 are respectively positioned at the following distances from the display 104: five feet, five feet, eight feet, ten feet, and fifteen feet. Accordingly, the threshold distance determined by the analysis component 106 can be a distance at which the respective distances from the display 104 of 80% of the audience members 112-116 are less than or equal to such distance; hence, pursuant to this example, the threshold distance determined by the analysis component 106 can be ten feet.

In accordance with another example, the threshold distance from the display 104 determined by the analysis component 106 can be a predefined percentage of the maximum distance from the display 104 out of the respective distances from the display 104 of the set of audience members 112-116 detected within proximity of the display 104. The predefined percentage, for example, can be 80%; however, it is to be appreciated that substantially any other predefined percentage is intended to fall within the scope of the hereto appended claims. Again, reference is made to the above exemplary illustration where the audience presence and position information obtained by the analysis component 106 indicates that five audience members 112-116 are respectively positioned at the following distances from the display 104: five feet, five feet, eight feet, ten feet, and fifteen feet. Thus, the threshold distance determined by the analysis component 106 can be 80% of the maximum distance; hence, according to this example, the threshold distance can be twelve feet.

Further, the render component 108 can control the size of the visual content 102 rendered on the display 104 responsive to the threshold distance from the display 104. The size of the visual content 102 can be controlled by the render component 108 based on heuristics and the threshold distance. Thus, the render component 108 can dynamically adjust the size of the visual content 102 rendered on the display 104 over time as a function of determined changes in the threshold distance from the display 104 over time. For example, the size of the visual content 102 rendered on the display 104 can be increased by the render component 108 when the threshold distance from the display 104 is determined to have increased over time. By way of another example, the size of the visual content 102 rendered on the display 104 can be decreased by the render component 108 when the threshold distance from the display 104 is determined to have decreased over time.

Various examples of types of the visual content 102 that can be controlled by the render component 108 are provided below. It is to be appreciated, however, that the claimed subject matter is not limited to the below examples, and other types of the visual content 102 and/or other sizes of the visual content 102 can be controlled by the render component 108.

According to an example, the size of the visual content 102 rendered on the display 104 as controlled by the render component 108 can be a font size of text rendered on the display 104. Following this example, the font size of the text presented on the display 104 can automatically adapt taking into account the presence and position of the audience members 112-116 within proximity of the display 104.

By way of another example, the size of the visual content 102 rendered on the display 104 as controlled by the render component 108 can be a size of a graphical object rendered on the display 104. The graphical object, for instance, can be a still image, a video, or the like. Thus, graphics and visual components such as pictures, diagrams, videos, etc. can be automatically zoomed in and/or out to allow the audience numbers 112-116 at various distances from the display 104 to enjoy such visual content 102.

According to a further example, the size of the visual content 102 rendered on the display 104 as controlled by the render component 108 can be a thickness of a line rendered on an interactive whiteboard. Following this example, the display 104 can be an interactive whiteboard. Thus, the render component 108 can control and/or adjust the thickness of a line generated by a pen used in an interactive whiteboard session to automatically be visible to the audience members 112-116 in proximity of the interactive whiteboard. Moreover, lines generated during the interactive whiteboard session can be scaled to enable the audience members 112-116 in proximity of the interactive whiteboard to see such visual content 102. For instance, lines previously rendered on the interactive whiteboard can be modified by the render component 108 (e.g., the thickness of such lines can be increased or decreased as the analysis component 106 determines that the threshold distance changes over time). Moreover, the thickness of the line generated by the pen utilized when subsequently generating content on the interactive whiteboard can be adjusted by the render component 108 responsive to such change in the threshold distance.

In accordance with various embodiments, it is contemplated that the size adjustments executed by the render component 108 can be discretized. Thus, the render component 108 can select the size of the visual content 102 rendered on the display 104 from a set of predefined discrete sizes as a function of the threshold distance from the display 104 as determined by the analysis component 106. Discretized size adjustment of the visual content 102 as well as the heuristics utilized by the render component 108 can mitigate continuous tuning based on changes in the presence and position information obtained by the analysis component 106. By way of illustration, continuous adjustment of the size of the visual content 102 can be mitigated when a significant number of changes in number or position of the audience members 112-116 occurs, which can lessen distractions associated with continuous size adjustment. Yet, it is contemplated that the claimed subject matter is not so limited. For instance, according to other embodiments, the render component 108 can select the size of the visual content 102 rendered on the display 104 from a continuous range of sizes as a function of the threshold distance from the display 104 as determined by the analysis component 106.

According to an illustration, the size of the visual content 102 controlled by the render component 108 can be a font size of text rendered on the display 104. In general, font sizes can range between a font size of 5 and a font size of 72. Following the example where a set of predefined discrete sizes are employed, it is contemplated that a subset of the font sizes between font size 5 and font size 72 can be included in the set of predefined discrete sizes; for instance, four out of the 67 font sizes in such range can be employed. Alternatively, following the example where the font size can be chosen from the continuous range of sizes, the font size can be any of the 67 font sizes between font size 5 and font size 72. It is to be appreciated, however, that the claimed subject matter is not limited to the foregoing examples.

The render component 108 can further employ hysteresis to provide latency whereby the system 100 is able to settle into a steady-state. For instance, the render component 108 can inhibit a subsequent adjustment to the size of the visual content 102 rendered on the display 104 for a predefined period of time after adjusting the size of the visual content 102 rendered on the display 104. The predefined period of time can be a tunable parameter or can be a static parameter; however, the claimed subject matter is not so limited.

Various exemplary scenarios are presented to illustrate operation of the system 100. Yet, it is to be appreciated that the claimed subject matter is not limited to such scenarios.

According to an exemplary scenario, a meeting can start with audience members 112-116 seated close to the display 104, where the visual content 102 is rendered on the display 104. Another audience member can join the meeting late and can sit at a far end of a table (e.g., at a greater distance from the display 104). The analysis component 106 can receive updated audience presence and position information and determine that the threshold distance increased. Based upon the increase in the threshold distance, the render component 108 can resize the visual content 102 on the display 104 to enable the late joining audience member to consume the visual content 102.

In accordance with another exemplary scenario, a teacher or a presenter can share visual content 102 on the display 104 to an audience in attendance that is changing in number and/or position over time. Thus, the analysis component 106 can detect changes in the threshold distance over time based upon the changes in number and/or position of the audience members 112-116. For example, the threshold distance can be the maximum distance from the display 104 as described above. Following this example, the size of the visual content 102 can be adapted to a farthest audience member from the set of audience members 112-116. Further, the tuning of the size can be maintained within certain thresholds and controlled by heuristics to mitigate continuous changes by the render component 108.

According to yet a further exemplary scenario, the display 104 can be an interactive whiteboard upon which a presenter can write with a whiteboard pen. Additional audience members can enter proximity of the interactive whiteboard and can be seated far from the interactive whiteboard. Hence, the analysis component 106 can detect an increase in the threshold distance. Responsive to the increase in the threshold distance, the render component 108 can automatically increase a thickness of a line generated by the whiteboard pen on the interactive whiteboard.

Now referring to FIG. 2, illustrated is a system 200 that tracks the audience members 112-116 within proximity of the display 104 for managing visual content 102 rendered on the display 104. The system 200 includes the display 104, the sensor 110, the analysis component 106, and the render component 108 as described above. Moreover, the system 200 includes a position track component 202 that, responsive to data received from sensor 110, can detect the audience members 112-116 positioned within proximity of the display 104. Moreover, the position track component 202 can determine the respective distances from the display 104 of the audience members 112-116 detected within proximity of the display 104 to generate the audience presence and position information. The respective distances from the display 104 of the audience members 112-116 determined by the position track component 202 can have an accuracy of ±1 foot, for example; yet, the claimed subject matter is not so limited. Such audience presence and position information can be provided to the analysis component 106 and employed as set forth above.

The position track component 202 can track the audience members 112-116 within proximity of the display 104 over time. For instance, as audience member(s) enter into the proximity of the display 104 or leave the proximity of the display 104, the position track component 202 can detect such changes and indicate such changes in the audience presence and position information. Moreover, the position track component 202 can evaluate the data received from the sensor 110 to track repositioning of the audience members 112-116 over time; accordingly, the position track component 202 can update the audience presence and position information based upon the repositioning of the audience members 112-116. It is contemplated that the position track component 202 can implement substantially any image processing algorithm to track such entry, exit, repositioning, etc. of the audience members 112-116 based on the data received from the sensor 110 over time.

Figure 3:
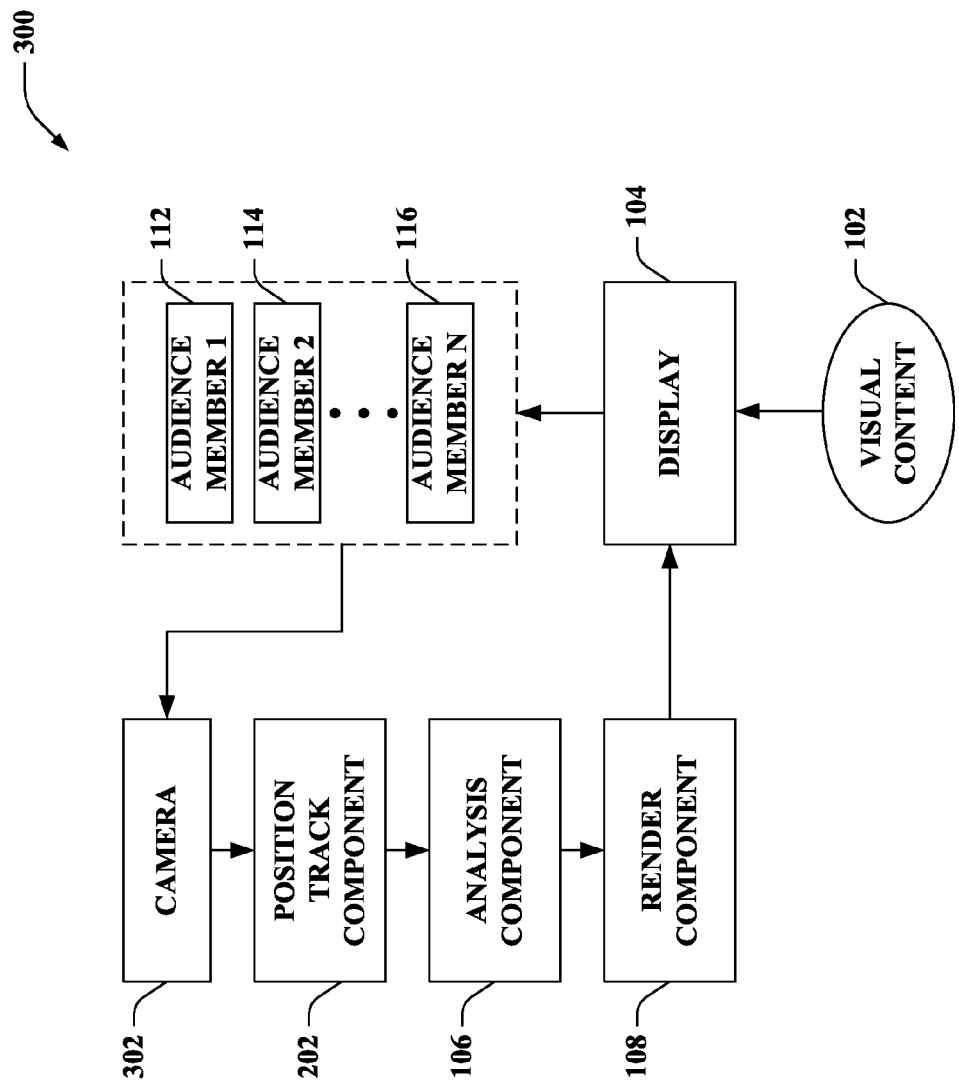
FIG. 3 illustrates a functional block diagram of an exemplary system that employs data from a camera for managing the size of the visual content rendered on the display.

Now turning to FIG. 3, illustrated is a system 300 that employs data from a camera 302 for managing the size of the visual content 102 rendered on the display 104. The system 300 further includes the display 104, the analysis component 106, and the render component 108.

As illustrated in FIG. 3, the camera 302 can be the sensor (e.g., the sensor 110) that can generate data from which the audience presence and position information can be determined. Although not shown, it is also contemplated that the system 300 can include a plurality of cameras similar to the camera 302. The camera 302, for example, can be an end-of-room camera. According to another example, the camera 302 can be a 360 degree video device. Yet, it is contemplated that substantially any configuration of the camera 302 that can enable identifying positions of the audience members 112-116 within proximity of the display 104 can be employed.

According to various embodiments, the system 300 can further include the position track component 202 that can receive output from the camera 302. Based on the output received from the camera 302, the position track component 202 can detect the audience members 112-116 positioned within proximity of the display 104 and determine the respective distances from the display 104 of the audience members 112-116 detected within proximity of the display 104 to generate the audience presence and position information. Moreover, the audience presence and position information can be provided to the analysis component 106 as set forth above.

Although not shown, in accordance with other embodiments, it is contemplated that the system 300 need not include the position track component 202. Thus, the camera 302 can detect the audience members 112-116 positioned within proximity of the display 104 and determine the respective distances from the display 104 of the audience members 112-116 detected within proximity of the display 104 to generate the audience presence and position information. The camera 302 can thereafter provide the audience presence and position information to the analysis component 106.

Figure 4:
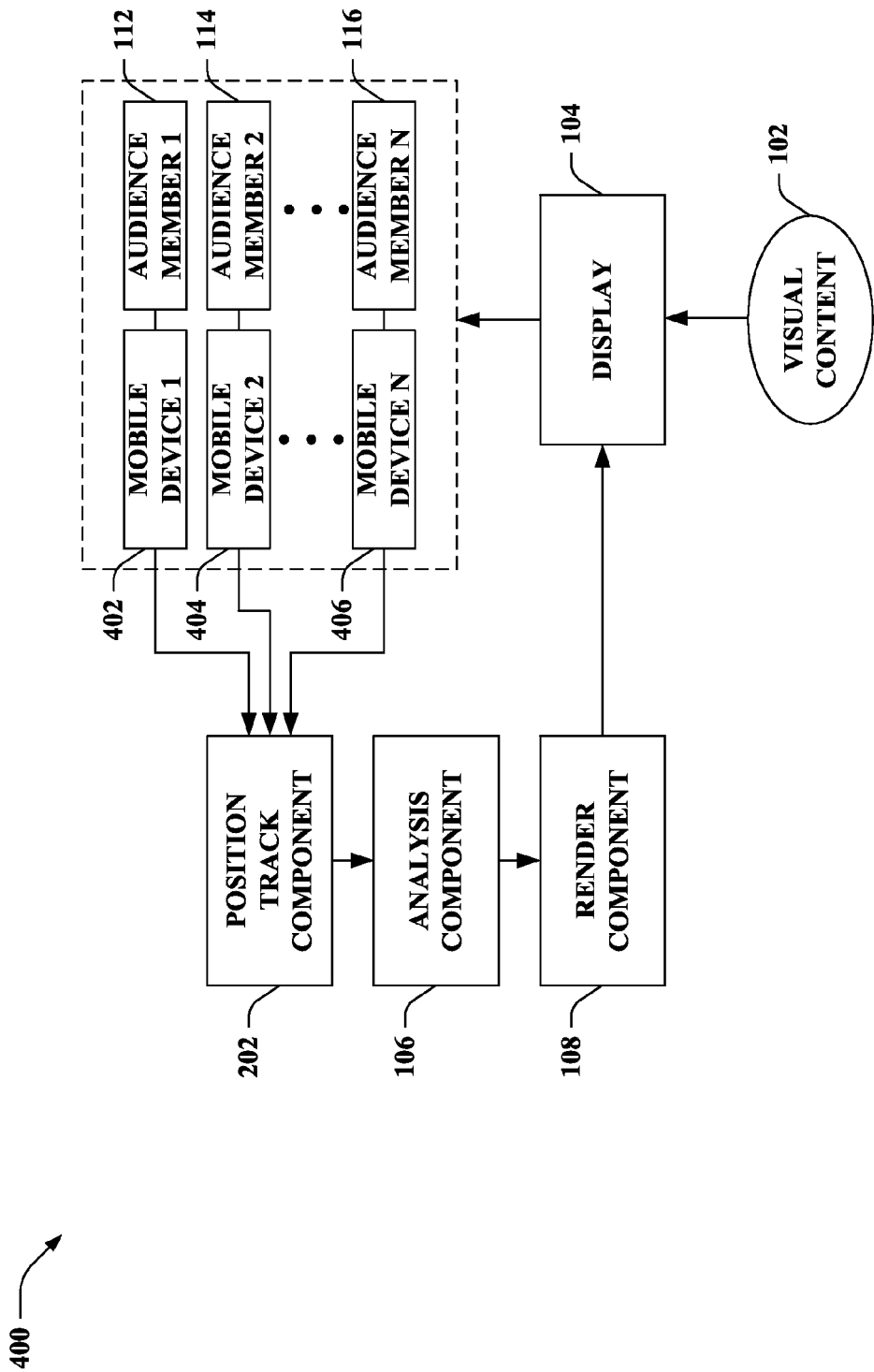
FIG. 4 illustrates a functional block diagram of an exemplary system that employs data from mobile devices of the audience members for managing the size of the visual content rendered on the display.

Now turning to FIG. 4, illustrated is a system 400 that employs data from mobile devices 402-406 of the audience members 112-116 for managing the size of the visual content 102 rendered on the display 104. The system 400 can include the display 104, the position track component 202, the analysis component 106, and the render component 108.

Moreover, each audience member 112-116 can be associated with a corresponding mobile device 402-406. For instance, the audience member 1 112 can be associated with a mobile device 1 402, the audience member 2 114 can be associated with a mobile device 2 404, . . . , and the audience member N 116 can be associated with a mobile device N 406 (e.g., where the mobile device 1 402, the mobile device 2 404, . . . , and the mobile device N 406 are collectively referred to herein as the mobile devices 402-406). Accordingly, the mobile devices 402-406 can be utilized as proximity sensors to identify the presence and position of the audience members 112-116. For instance, substantially any technique can be employed by the mobile devices 402-406 to detect the respective positions of such mobile devices 402-406.

The mobile devices 402-406 within proximity of the display 104 can communicate location data to the position track component 202. The position track component 202 can utilize the location data received from the mobile devices 402-406 to generate the audience presence and position information. According to an example, the mobile device 1 402 of the audience member 1 112 can send detected location data to the position track component 202. Following this example, responsive to the location data received from the mobile device 1 402, the position track component 202 can evaluate a distance between the display 104 and the mobile device 1 402. The position track component 202 can similarly evaluate respective distances between the display 104 and the remaining mobile devices 402-406. Further, the mobile devices 402-406 can be considered to be collocated with the associated audience members 112-116, and hence, the distances between the display 104 and the mobile devices 402-406 can employed as the distances between the display 104 and the audience members 112-116.

Figure 5:
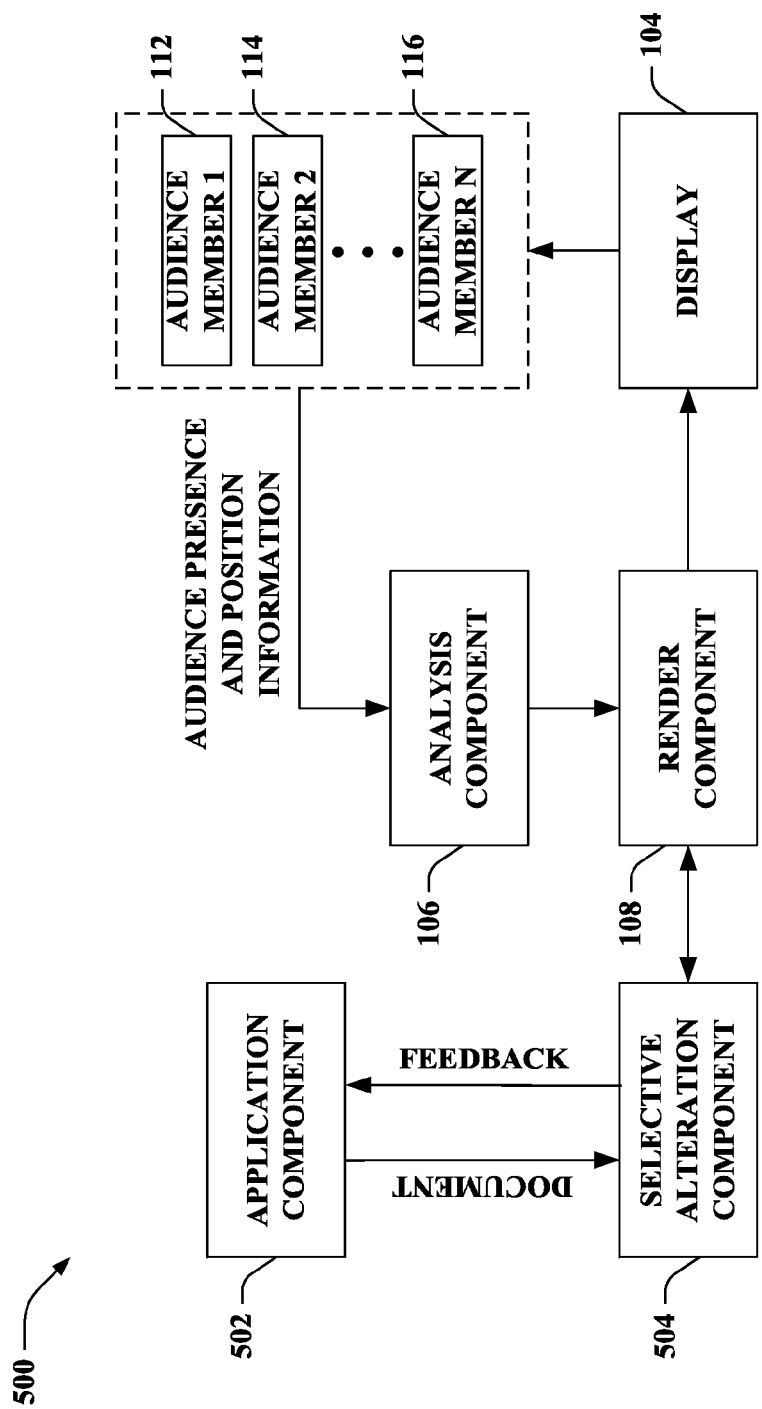
FIG. 5 illustrates a functional block diagram of an exemplary system that selectively manages size of visual content rendered on the display.

Now referring to FIG. 5, illustrated is a system 500 that selectively manages size of visual content rendered on the display 104. Again, the system 500 includes the display 104, the analysis component 106, and the render component 108. The system 500 further includes an application component 502 that generates a document that includes visual content (e.g., the visual content 102) for rendering on the display 104. The application component 502 can output text, graphics, video, and other visual content (as well as other content such as audio content, etc.), which can be presented via the display 104. Moreover, the application component 502 can receive feedback corresponding to changes in size of visual content provided by the render component 108.

Moreover, the system 500 includes a selective alteration component 504 that can receive the document that includes the visual content from the application component 502. The selective alteration component 504 can detect whether to enable or disable the render component 108 from dynamically adjusting the size of the visual content rendered on the display 104 as a function of the threshold distance from the display 104 determined by the analysis component 106 based on a property of the visual content and/or a property of the document that comprises the visual content. According to an example, the selective alteration component 504 can evaluate whether the document includes formatting that can inhibit automatic scaling of the size of the visual content included therein. For instance, the selective alteration component 504 can detect whether the document includes page breaks, manually inserted margins, carriage returns, fixed dimensions for graphical objects, etc., which can be ill-suited for dynamic resizing by the render component 108. Thus, if the document is detected to include such formatting, then the selective alteration component 504 can disable the render component 108 from dynamically adjusting the size of the visual content. Alternatively, if such formatting is detected to be omitted from the document that includes the visual content, the selective alteration component 504 can enable the render component 108 to dynamically adjust the size of the visual content rendered on the display 104 as a function of the threshold distance from the display 104.

According to another example, the selective alteration component 504 can enable or disable the render component 108 from dynamically adjusting the size of the visual content responsive to receipt of an input. For instance, the input can be received from a user, the application component 502, or the like. By way of illustration, user provided input can disable the render component 108 from dynamically adjusting the size of the visual content or enable the render component 108 to dynamically adjust the size of the visual content; yet, the claimed subject matter is not so limited.

Figure 6:
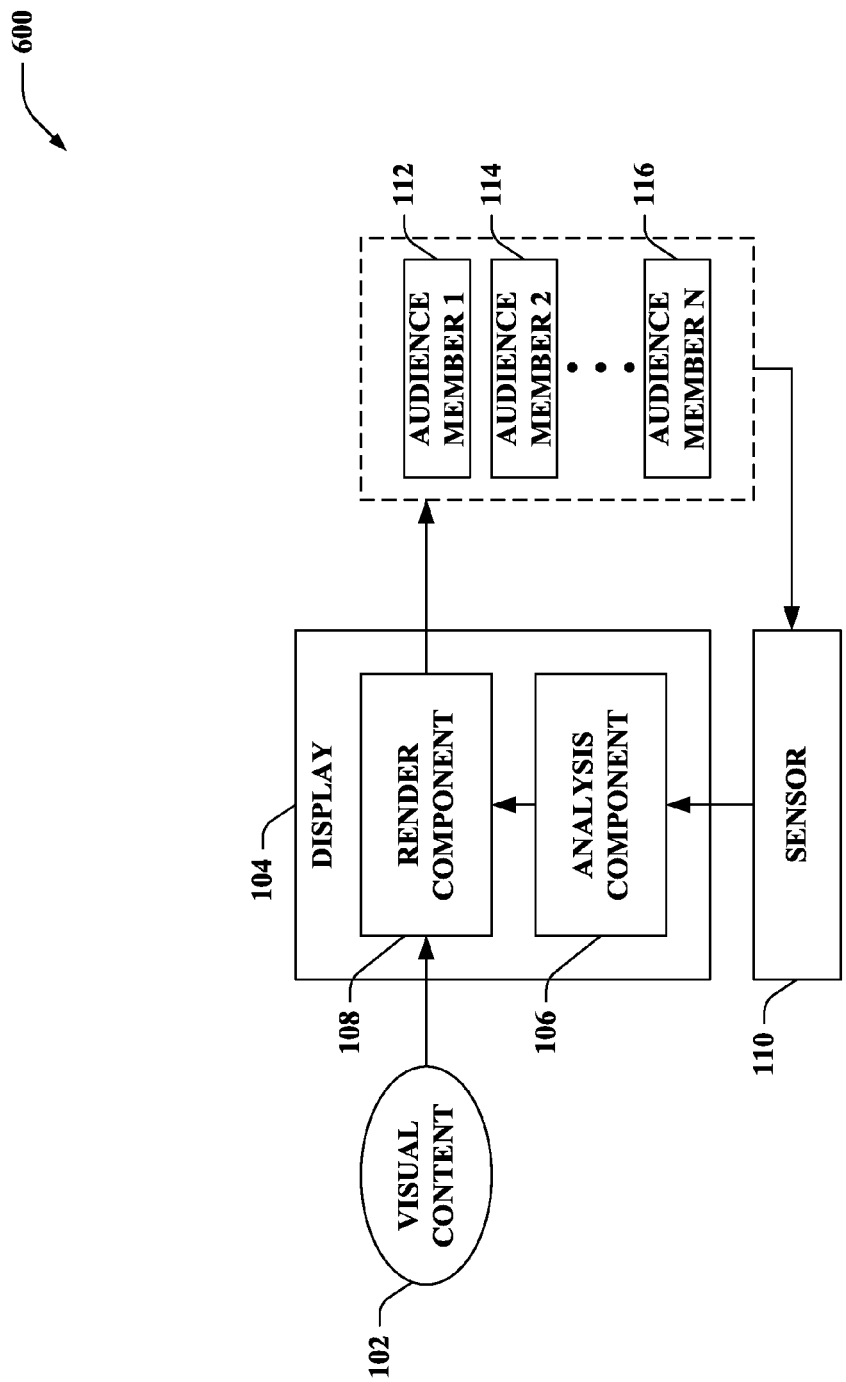
FIG. 6 illustrates a functional block diagram of an exemplary system that facilitates managing the visual content rendered on the display.

With reference to FIG. 6, illustrated is a system 600 that facilitates managing the visual content 102 rendered on the display 104. As shown in FIG. 6, the display 104 can include the analysis component 106 and the render component 108. Moreover, although not illustrated, it is contemplated that the display 104 can include the position track component 202 of FIG. 2; yet, the claimed subject matter is not so limited.

The system 600 further includes the sensor 110. The sensor 110 can be external to the display 104 as depicted in FIG. 6, for example. However, it is also contemplated that the sensor 110 can be integrated into the display 104 (e.g., an interactive whiteboard can include an integrated camera, etc.).

According to an example, the display 104 can include the position track component 202 that, responsive to data received from the sensor 110 (e.g., a camera), can detect audience members 112-116 positioned within proximity of the display 104. Further, the position track component 202 can determine respective distances from the display 104 of the audience members 112-116 detected within proximity of the display 104. Moreover, the display 104 can include the analysis component 106, which can determine the threshold distance from the display 104 as a function of the respective distances from the display 104 of the audience members 112-116 detected within proximity of the display 104. Further, the display 104 can include the render component 108 that can dynamically adjust the size of the visual content 102 rendered on the display as a function of the threshold distance from the display 104. Yet, it is contemplated that the claimed subject matter is not limited to the foregoing example.

FIGS. 7-12 illustrate various exemplary scenarios of auto-adjusting visual content rendered on a display. It is to be appreciated that these scenarios are presented for illustration purposes, and the claimed subject matter is not so limited. For instance, while these scenarios depict audience members joining or leaving a meeting from positions farthest from the display 104, it is to be appreciated that audience members can join or leave from any positions with respect to the display 104. Moreover, audience members can move within proximity of the display 104, thereby causing the threshold distance to be changed (e.g., which can lead to alterations of the visual content rendered upon the display 104). Further, it is to be appreciated that these scenarios can be concurrent (e.g., text and graphics can be concurrently rendered on the display 104 and sizes thereof can be altered as a function of the threshold distance, etc.).

Figure 7:
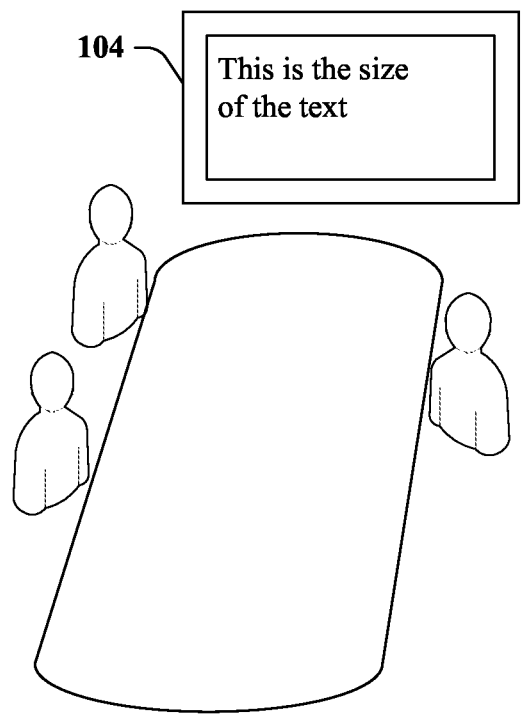
FIGS. 7-8 illustrate an exemplary scenario where a font size of text rendered on the display is controlled based on audience member presence and position within proximity of the display.
Figure 8:
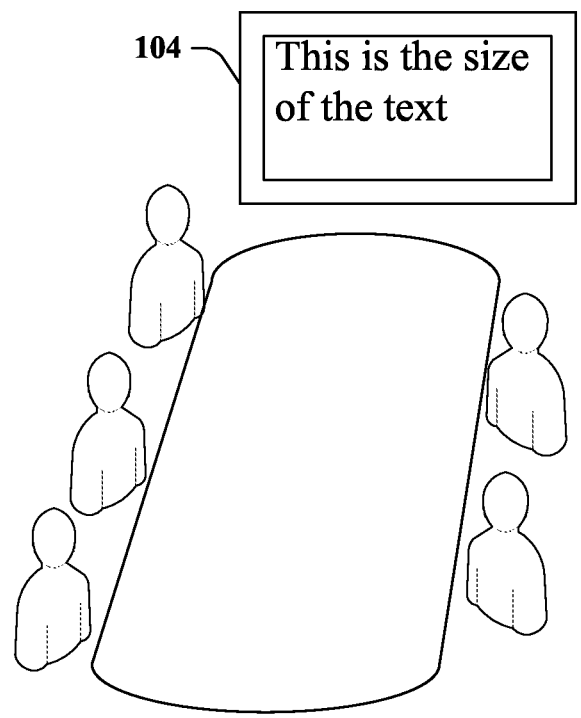

With reference to FIGS. 7-8, illustrated is an exemplary scenario where a font size of text rendered on the display 104 is controlled based on audience member presence and position within proximity of the display 104. As illustrated in FIG. 7, a meeting can begin with audience members seated close to the display 104. Thus, a first font size for the text rendered on the display 104 can be utilized (e.g., as controlled by the render component 108 based on the threshold distance). Thereafter, as shown in FIG. 8, additional audience members can join the meeting at a later point in time and sit at a far end of the table (e.g., farther from the display 104 as compared to the audience members shown in FIG. 7). Accordingly, the presence and position of the audience members can be detected, and an increase in the threshold distance can be identified. Thus, the text rendered on the display 104 can be resized on the display 104 as a function of the increased threshold distance to facilitate consumption of the text by the audience members that joined the meeting at the later point in time.

Similarly, it is contemplated that if audience members farthest from the display 104 exit the proximity of the display 104, then the font size of the text rendered on the display 104 can be decreased (e.g., due to the decrease in the threshold distance). Following this illustration, for instance, if a subset of the audience members shown in FIG. 8 exits the proximity of the display 104, thereby leaving the audience members as shown in FIG. 7, then the font size of the text rendered on the display 104 can be decreased from the font size depicted in FIG. 8 to the font size depicted in FIG. 7. Moreover, although not shown, it is to be appreciated that the audience members can move within proximity of the display 104 (e.g., thereby changing the threshold distance), and hence, the font size of the text rendered on the display 104 can change based upon the change in threshold distance.

Figure 9:
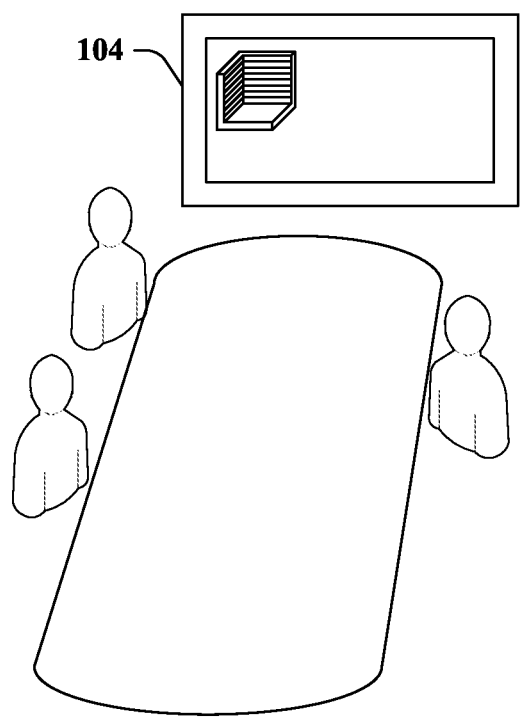
FIGS. 9-10 illustrate an exemplary scenario where a size of a graphical object rendered on the display is controlled based on the presence and position of audience members within proximity of the display.
Figure 10:
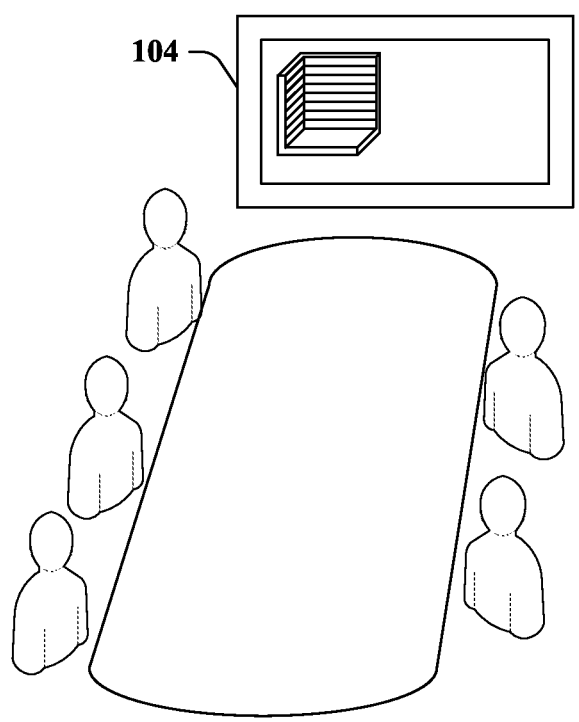

Now turning to FIGS. 9-10, illustrated is another exemplary scenario where a size of a graphical object rendered on the display 104 is controlled based on the presence and position of audience members within proximity of the display 104. Similar to the above discussion with respect to FIGS. 7-8, the size of the graphical object can be increased as the threshold distance increases (e.g., due to additional audience members joining the meeting and sitting at farther distances from the display 104 as shown by the transition from FIG. 9 to FIG. 10). Likewise, the size of the graphical object rendered on the display 104 can be decreased as the threshold distance decreases (e.g., due to audience members seated farthest from the display 104 exiting the proximity of the display 104 as depicted by the transition from FIG. 10 to FIG. 9).

Figure 11:
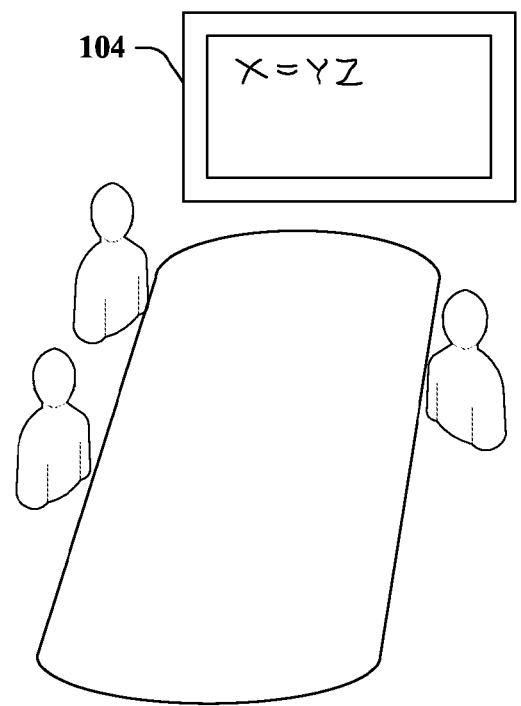
FIGS. 11-12 illustrate an exemplary scenario where a thickness of a line rendered on the display 104 is controlled based on the presence and position of audience members within proximity of the display.
Figure 12:
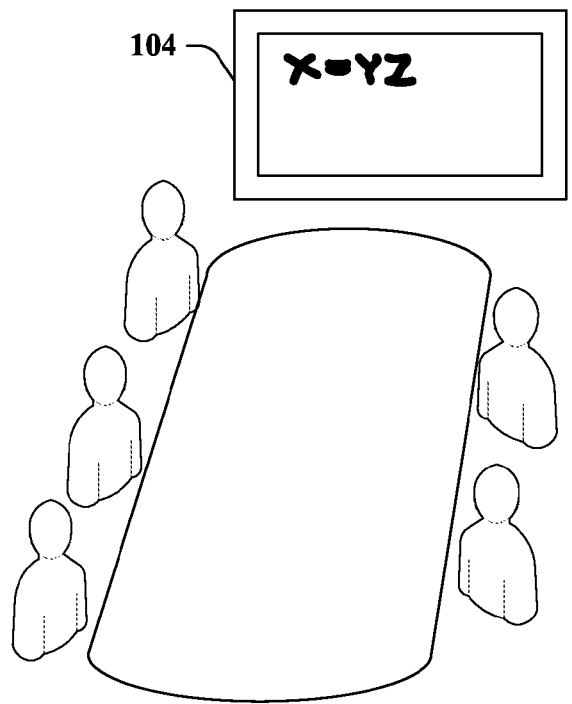

Turning to FIGS. 11-12, illustrated is another exemplary scenario where a thickness of a line rendered on the display 104 is controlled based on the presence and position of audience members within proximity of the display 104. In FIGS. 11-12, the display 104 can be an interactive whiteboard. For instance, the thickness of the lines rendered on the interactive whiteboard can be increased as the threshold distance increases (e.g., due to additional audience members joined the meeting and sitting at farther distances from the interactive whiteboard as shown by the transition from FIG. 11 to FIG. 12). Moreover, the thickness of the lines rendered on the interactive whiteboard can be decreased as the threshold distance decreases (e.g., due to audience members seated farthest from the interactive whiteboard exiting the proximity of the interactive whiteboard as depicted by the transition from FIG. 12 to FIG. 11).

According to the scenario shown in FIGS. 11-12, an attendee of a meeting can go to the interactive whiteboard and begin to write on the interactive whiteboard using a whiteboard pen (e.g., as shown in FIG. 11). Additional audience members can thereafter enter the room seated at greater distances from the interactive whiteboard as shown in FIG. 12 as compared to FIG. 11. Thus, the thickness of lines generated by the pen can adjust automatically to allow audience members positioned at greater distances from the interactive whiteboard to consume the content presented upon the interactive whiteboard.

Figure 13:
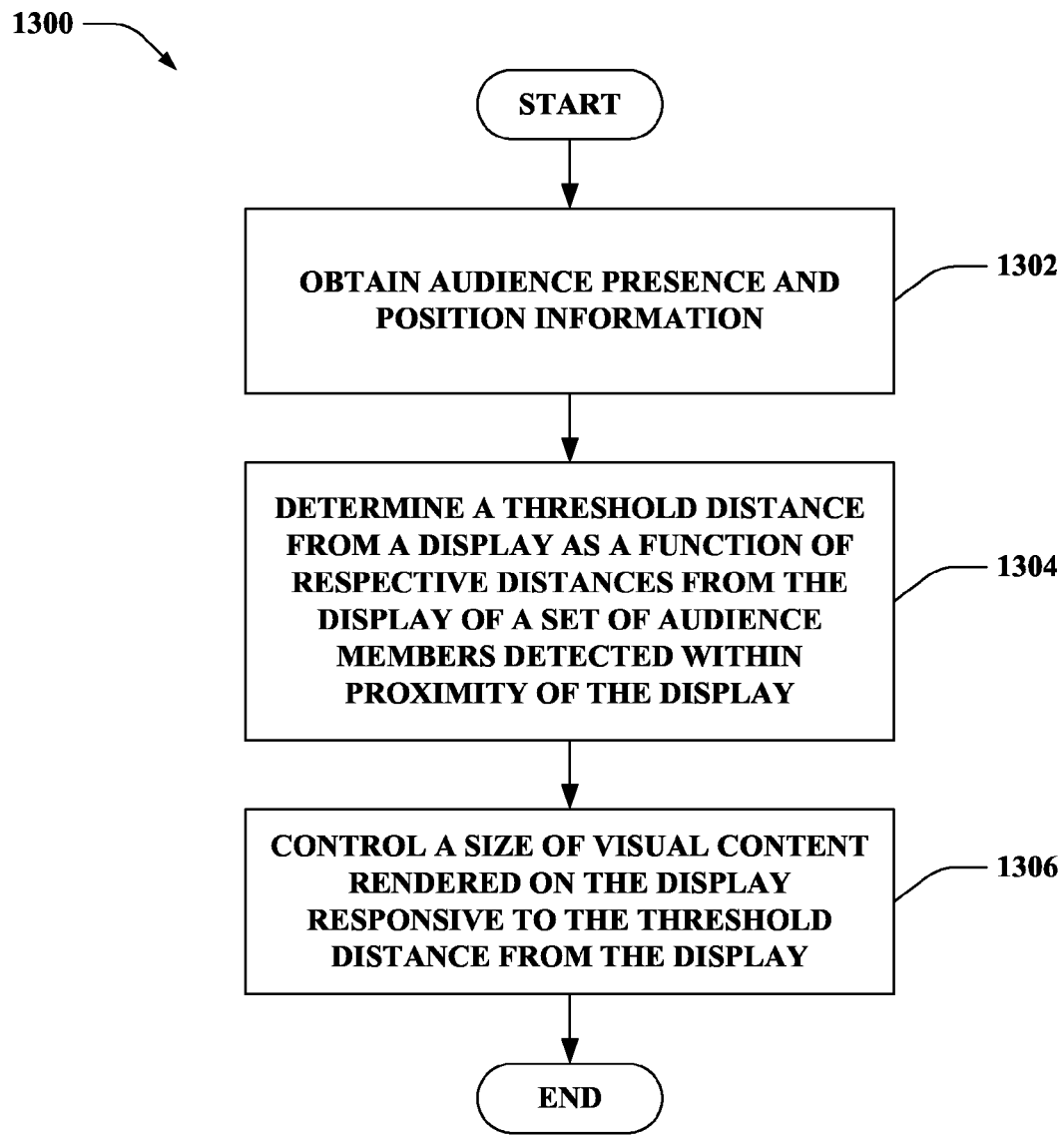
FIG. 13 is a flow diagram that illustrates an exemplary methodology of managing visual content rendering for a display.

FIG. 13 illustrates an exemplary methodology relating to auto-adjusting content size rendered on a display. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

FIG. 13 illustrates a methodology 1300 of managing visual content rendering for a display. At 1302, audience presence and position information can be obtained. The audience presence and position information can specify respective distances from the display of a set of audience members detected within proximity of the display. At 1304, a threshold distance from the display can be determined as a function of respective distances from the display of a set of audience members detected within proximity of the display. At 1306, a size of the visual content rendered on the display can be controlled responsive to the threshold distance from the display.

Figure 14:
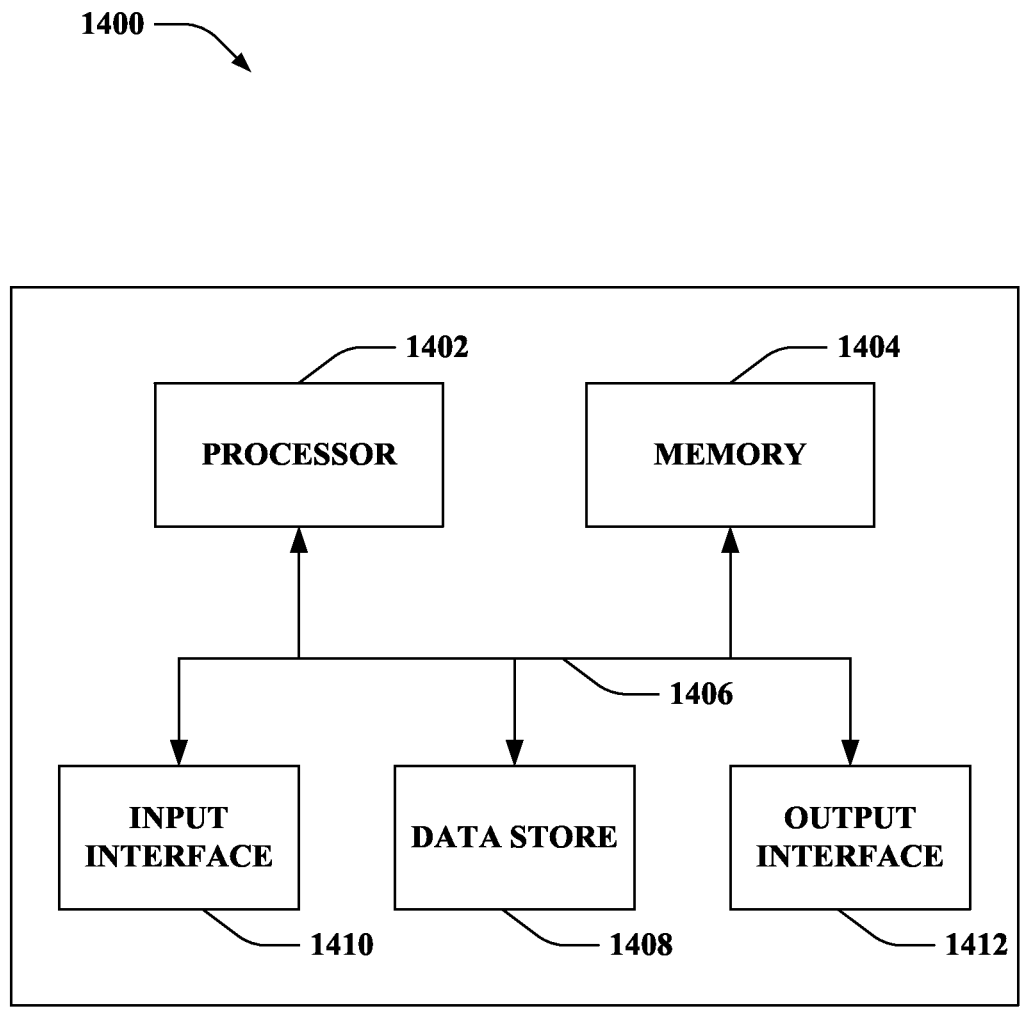
FIG. 14 illustrates an exemplary computing device.

Referring now to FIG. 14, a high-level illustration of an exemplary computing device 1400 that can be used in accordance with the systems and methodologies disclosed herein is illustrated. For instance, the computing device 1400 may be used in a system auto-adjusts size of visual content rendered on a display based upon presence and position of audience members within proximity of the display. The computing device 1400 includes at least one processor 1402 that executes instructions that are stored in a memory 1404. The instructions may be, for instance, instructions for implementing functionality described as being carried out by one or more components discussed above or instructions for implementing one or more of the methods described above. The processor 1402 may access the memory 1404 by way of a system bus 1406. In addition to storing executable instructions, the memory 1404 may also store visual content, documents, audience presence and position information, and so forth.

The computing device 1400 additionally includes a data store 1408 that is accessible by the processor 1402 by way of the system bus 1406. The data store 1408 may include executable instructions, visual content, documents, audience presence and position information, etc. The computing device 1400 also includes an input interface 1410 that allows external devices to communicate with the computing device 1400. For instance, the input interface 1410 may be used to receive instructions from an external computer device, from a user, etc. The computing device 1400 also includes an output interface 1412 that interfaces the computing device 1400 with one or more external devices. For example, the computing device 1400 may display text, images, etc. by way of the output interface 1412.

It is contemplated that the external devices that communicate with the computing device 1400 via the input interface 1410 and the output interface 1412 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1400 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1400 may be a distributed system. Thus, for instance, several devices may be in communication by way of a network connection and may collectively perform tasks described as being performed by the computing device 1400.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of managing visual content rendering for a display, comprising:
    receiving location data from mobile devices of audience members and for each of the mobile devices, specifying a corresponding position of the mobile device;
    determining respective distances between the display and each of the mobile devices of the audience members detected within proximity of the display based on the location data received from the mobile devices of the audience members detected within proximity of the display;
    determining a threshold distance from the display as a function of the respective distances between the display and each of the mobile devices of the audience members detected within proximity of the display, including determining a predefined percentage of a maximum distance from the display, wherein the maximum distance is from the respective distances between the display and the mobile devices of the audience members detected within proximity of the display, wherein the predefined percentage of the maximum distance from the display is less than the maximum distance from the display; and
    controlling a size of the visual content rendered on the display based on the threshold distance from the display.

2. The method of claim 1, the size of the visual content comprises at least one of a font size of text rendered on the display or a size of a graphical object rendered on the display.

3. The method of claim 1, wherein determining the threshold distance from the display further comprises determining a maximum distance from the display out of the respective distances between the display and each of the mobile devices of the audience members detected within proximity of the display.

4. The method of claim 1, wherein determining the threshold distance from the display further comprises determining a distance at which the respective distances between the display and a preset percentage of the mobile devices of the audience members detected within proximity of the display are less than or equal to the distance.

5. The method of claim 1, wherein controlling the size of the visual content rendered on the display based on the threshold distance from the display further comprises adjusting the size of the visual content rendered on the display over time as a function of determined changes in the threshold distance from the display over time.

6. The method of claim 5, further comprising inhibiting a subsequent adjustment to the size of the visual content rendered on the display for a predefined period of time after adjusting the size of the visual content rendered on the display.

7. The method of claim 1, further comprising selecting the size of the visual content rendered on the display from a set of predefined discrete sizes as a function of the threshold distance from the display.

8. The method of claim 1, further comprising detecting, based on at least one of a property of the visual content or a property of a document that comprises the visual content, whether to dynamically adjust the size of the visual content rendered on the display as a function of the threshold distance from the display.

9. The method of claim 1, the size of the visual content comprises a thickness of a line generated by a pen on the display.

10. The method of claim 1, further comprising:
    detecting whether a document that comprises the visual content comprises formatting that inhibits automatic scaling of the size of the visual content;
    enabling the size of the visual content to be dynamically adjusted when the document is determined to lack the formatting that inhibits the automatic scaling of the size of the visual content; and
    disabling the size of the visual content from being dynamically adjusted when the document is determined to comprise the formatting that inhibits the automatically scaling of the size of the visual content.

11. The method of claim 1, further comprising detecting that a mobile device is within proximity of the display when the mobile device is in a room in which the display is located.

12. The method of claim 1, further comprising detecting that a mobile device is within proximity of the display when the mobile device is in an area within a predefined distance from the display.

13. A system that facilitates managing visual content rendered on a display, comprising:
    a processor; and
    a memory that is programmed with instructions that, when executed by the processor, cause the processor to perform acts comprising:
        receiving location data from mobile devices of audience members, and for each of the mobile devices, specifying a corresponding position of the mobile device;
        generating respective distances between the display and each of the mobile devices of the audience members detected within proximity of the display based on the location data received from the mobile devices of the audience members detected within proximity of the display;
        determining a threshold distance from the display as a function of the respective distances between the display and each of the mobile devices of the audience members detected within proximity of the display, including determining a predefined percentage of a maximum distance from the display, wherein the maximum distance is from the respective distances between the display and the mobile devices of the audience members detected within proximity of the display, wherein the predefined percentage of the maximum distance from the display is less than the maximum distance from the display; and
        dynamically adjusting a size of the visual content rendered on the display as a function of the threshold distance from the display.

14. The system of claim 13, wherein the size of the visual content rendered on the display comprises at least one of a font size of text rendered on the display or a size of a graphical object rendered on the display.

15. The system of claim 13 comprised in the display.

16. The system of claim 13, the acts further comprising:
    receiving a document that comprises the visual content; and
    detecting whether to one of enable or disable dynamically adjusting the size of the visual content rendered on the display as a function of the threshold distance from the display based on at least one of a property of the visual content or a property of the document that comprises the visual content.

17. The system of claim 13, wherein the threshold distance from the display is a distance at which the respective distances between the display and a preset percentage of the mobile devices of the audience members detected within proximity of the display are less than or equal to the distance.

18. The system of claim 13, wherein the size of the visual content rendered on the display comprises thicknesses of a first line previously generated by a pen on the display and a second line subsequently generated by the pen on the display.

19. A display, comprising:
    a processor; and
    a memory that is programmed with instructions that, when executed by the processor, cause the processor to perform acts comprising:
        receiving location data from mobile devices of audience members and for each of the mobile devices, specifying a corresponding position of the mobile device;
        responsive to receiving the location data from the mobile devices of the audience members, determining respective distances between the display and the mobile devices of the audience members detected within proximity of the display;
        determining a threshold distance from the display as a function of the respective distances between the display and the mobile devices of the audience members detected within proximity of the display, including determining a predefined percentage of a maximum distance from the display, wherein the maximum distance is from the respective distances between the display and the mobile devices of the audience members detected within proximity of the display, wherein the predefined percentage of the maximum distance from the display is less than the maximum distance from the display; and
        dynamically adjusting a size of visual content rendered on the display as a function of the threshold distance from the display, wherein the size of the visual content comprises a thickness of a line generated by a pen on the display.

* * * * *